US012789837B2

(12) United States Patent
Gupta et al.

(10) Patent No.: US 12,789,837 B2
(45) Date of Patent: Nov. 10, 2026

(54) METHODS AND SYSTEMS FOR PERSONALIZED NOTIFICATIONS AMONG MOVING OBJECTS

(71) Applicant: Toyota Motor Engineering & Manufacturing North America, Inc., Plano, TX (US)

(72) Inventors: Rohit Gupta, Santa Clara, CA (US); Sergei S. Avedisov, Mountain View, CA (US); Paul Li, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 161 days.

(21) Appl. No.: 18/363,032

(22) Filed: Aug. 1, 2023

(65) Prior Publication Data

US 2025/0042432 A1 Feb. 6, 2025

(51) Int. Cl.
*B60W 60/00* (2020.01)
*B60W 40/09* (2012.01)
*B60W 50/14* (2020.01)

(52) U.S. Cl.
CPC .......... *B60W 60/001* (2020.02); *B60W 40/09* (2013.01); *B60W 50/14* (2013.01); *B60W 2556/10* (2020.02)

(58) Field of Classification Search
CPC .... B60W 60/001; B60W 40/09; B60W 50/14; B60W 2556/10
See application file for complete search history.

(56) References Cited

U.S. PATENT DOCUMENTS

| | | | | |
|---|---|---|---|---|
| 8,589,061 | B2 | 11/2013 | Bengtsson et al. | |
| 9,672,713 | B2 | 6/2017 | Beggs et al. | |
| 10,943,477 | B2 | 3/2021 | Bender et al. | |
| 11,749,116 | B1 * | 9/2023 | Young | G08G 1/168 340/932.2 |
| 2019/0147260 | A1 * | 5/2019 | May | B60W 50/14 382/103 |
| 2020/0079385 | A1 * | 3/2020 | Beaurepaire | B60W 50/08 |
| 2020/0133280 | A1 * | 4/2020 | Seccamonte | B60W 60/0016 |
| 2020/0406906 | A1 * | 12/2020 | Omari | G05D 1/0223 |
| 2021/0201664 | A1 | 7/2021 | McQuillen et al. | |

FOREIGN PATENT DOCUMENTS

| | | |
|---|---|---|
| CN | 113160564 A | 7/2021 |
| KR | 102339521 B1 | 12/2021 |

* cited by examiner

*Primary Examiner* — Jerrod Irvin Davis
(74) *Attorney, Agent, or Firm* — Dinsmore & Shohl LLP

(57) ABSTRACT

Methods and systems for personalized notifications are provided. The methods and systems may include determining a comfort level of a user based on a reaction of the user to a road situation associated with road traffic, defining a zone of the user based on the comfort level, the zone including a location of the user, providing a notification to a vehicle, the notification including information associated with the zone, in response to a result of a comparison of the zone and a trajectory of the vehicle, and controlling the vehicle to drive based on the notification.

20 Claims, 4 Drawing Sheets

METHODS AND SYSTEMS FOR PERSONALIZED NOTIFICATIONS AMONG MOVING OBJECTS

TECHNICAL FIELD

The present disclosure relates to personalized notifications and, more particularly, to providing personalized safety notifications among moving objects.

BACKGROUND

Drivers, pedestrians, or cyclists may encounter each other on roads may benefit from safety notifications. For example, a safety notification may be sent to a driver of a vehicle when the vehicle approaches a pedestrian or a cyclist at intersections, crosswalks, sidewalks, shoulders, or the like. However, the driver, the pedestrian, and the cyclist may have different comfort levels or preferences. Therefore, the safety notification may be tailored to individual needs or preferences.

SUMMARY

In accordance with one embodiment of the present disclosure, a method is provided. The method includes determining a comfort level of a user based on a reaction of the user to a road situation associated with road traffic, defining a zone of the user based on the comfort level, the zone including a location of the user, providing a notification to a vehicle, the notification including information associated with the zone, in response to a result of a comparison of the zone and a trajectory of the vehicle, and controlling the vehicle to drive based on the notification.

In accordance with another embodiment of the present disclosure, a system is provided. The system includes one or more processors and memory containing executable instructions being executable by the one or more processors to perform a method. The method includes determining a comfort level of a user based on a reaction of the user to a road situation associated with road traffic, defining a zone of the user based on the comfort level, the zone including a location of the user, providing a notification to a vehicle, the notification including information associated with the zone, in response to a result of a comparison of the zone and a trajectory of the vehicle, and controlling the vehicle to drive based on the notification.

These and additional features provided by the embodiments described herein will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods and systems for providing a personalized notification. In embodiments disclosed herein, the methods and systems may personalize the notification based on a comfort level of users. The comfort level may be determined based on a reaction of the user to a road situation. The users may self-report of the system may determine the comfort level of the users and tailor the notification based on the comfort level. Since the comfort level takes the road situation into consideration, the comfort level may be tailored to reflect a certain road situation that may increase or decrease the comfort level of a certain individual. The notification may be tailored regarding when to send out and/or what kind of information to send out as the notification. As such, the notification may convey personal preferences with respect to safety or perceived (e.g., psychological) safety zone which may allow the system to account for individual differences. The system may ensure actual safety of the user as well as perceived safety of the user. The system may also increase accuracy of determination of the perceived comfort level.

Figure 1:
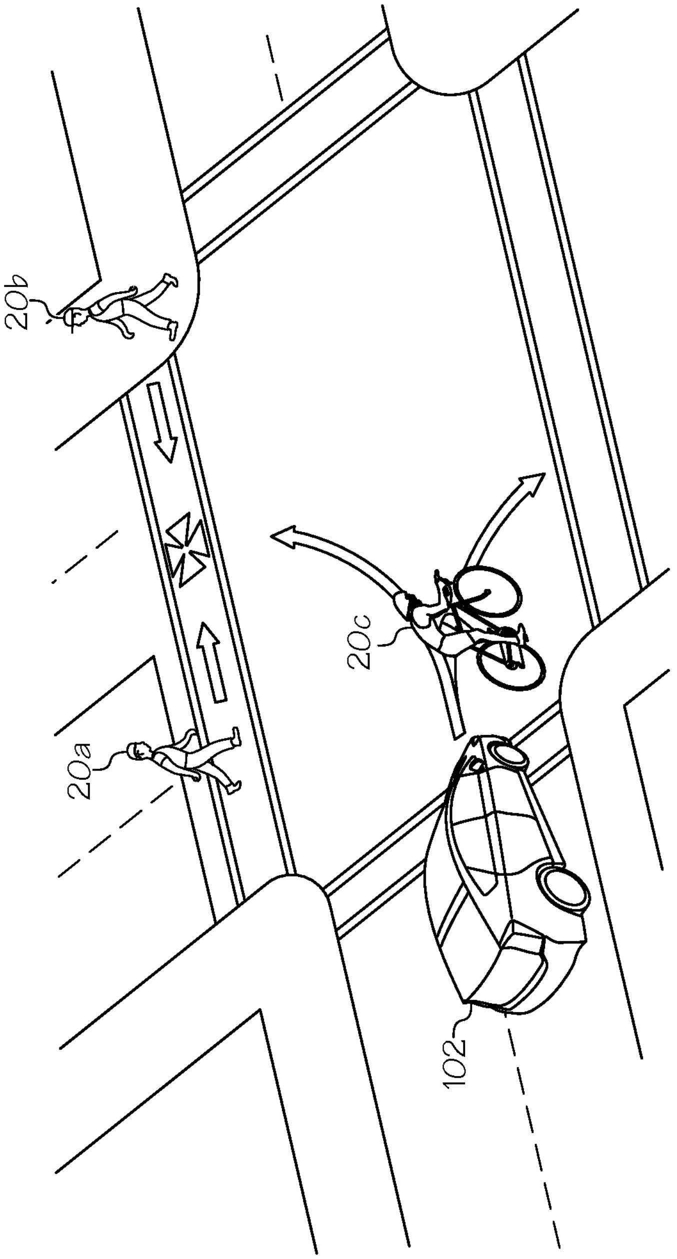
FIG. 1 depicts a schematic diagram of a road situation, according to one or more embodiments shown and described herein.

Referring to FIG. 1, a road situation may involve a pedestrian 20*a* crossing a crosswalk, a pedestrian 20*b* entering the crosswalk, and a cyclist 20*c* going straight at an intersection. A vehicle 102 may turn left and approach the pedestrians 20*a* and 20*b* or the vehicle may turn right and approach the cyclist 20*c*. When turning left, a driver of the vehicle 102 may focus on the pedestrian 20*a* already crossing the crosswalk and may fail to see the pedestrian 20*b* who is still on the sidewalk. When turning right, the driver of the vehicle 102 may drive without paying attention to the cyclist 20*c* and may fail to see the cyclist 20*c* (e.g., right hook incident).

The individuals involved in the road situation (e.g., the pedestrian 20*a*, the pedestrian 20*b*, and the cyclist 20*c*) may perceive the road situation differently. One may react more sensitive than the other in the same road situation. For example, the pedestrian 20*a* may feel safe when the vehicle 102 is approaching but away from the pedestrian 20*a* for a certain distance, but the pedestrian 20*b* may feel unsafe when the vehicle 102 is approaching from the same certain distance. Also, the road situation may change the perceived safety level. For example, the pedestrian 20*a* may feel safe when the vehicle 102 is within a distance and turning right, but the pedestrian 20*a* may feel unsafe when the vehicle 102 is within the same distance but turning left toward the pedestrian 20*a*. The differences in feeling of safety between individuals may affect when the individuals would like to receive or send out a notification (e.g., a safety warning). Embodiments discussed herein may improve safety and reduce anxiety of pedestrians and/or the drivers by personalizing the notification. Providing the personalized notification may be utilized to augment the driver's abilities to address challenging maneuvers. Some drivers may be prone to making specific mistakes or oversights when performing a maneuver. For example, some drivers may fail to see a pedestrian on the crosswalk when turning left or turning right unprotected. The personalized notification may help drivers drive safe and/or pedestrians stay safe.

Figure 2:
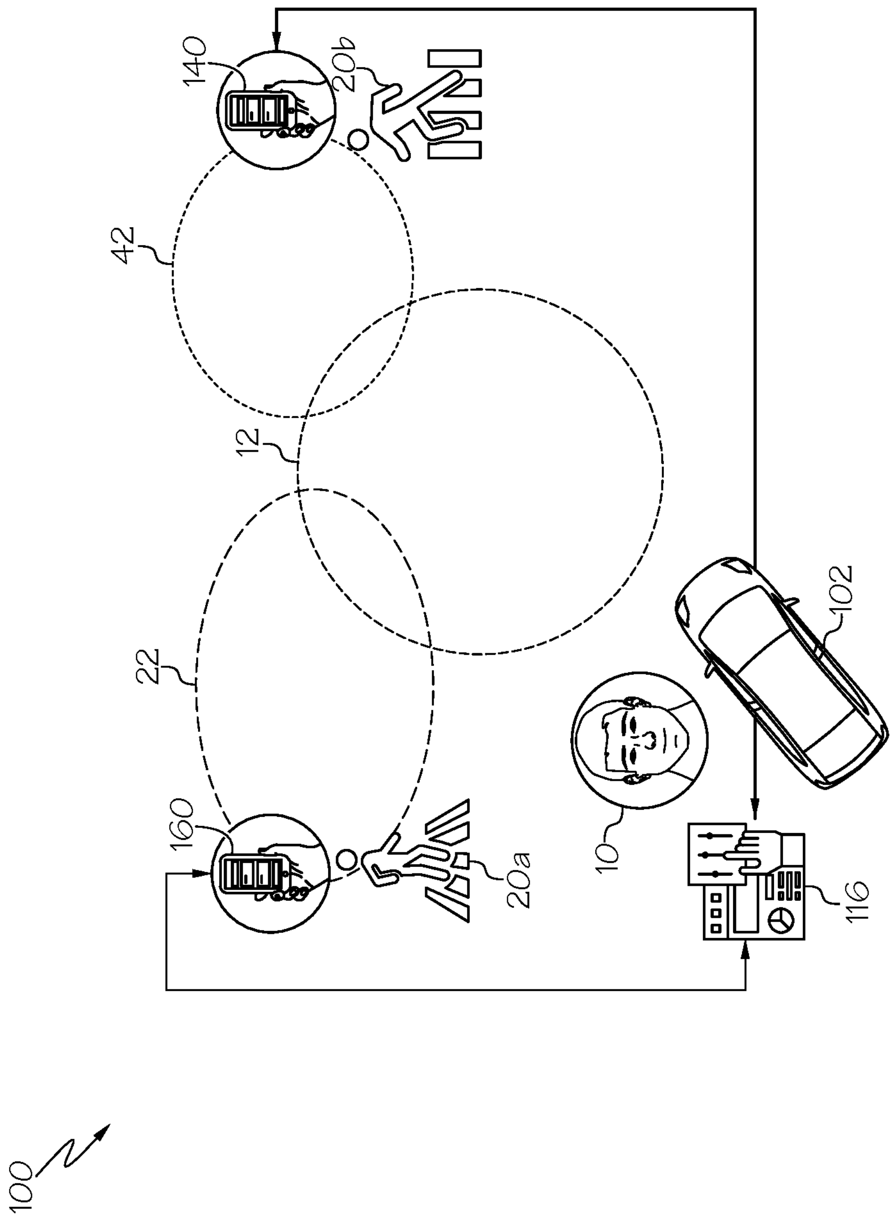
FIG. 2 depicts a schematic diagram of a system, according to one or more embodiments shown and described herein.

Referring to FIG. 2, a system 100 determines a comfort level of a user (e.g., the pedestrian 20*a*, the pedestrian 20*b*, the cyclist 20*c*, the driver 10 of the vehicle 102, or the like) based on a reaction of the user to a road situation associated with road traffic at a location. In embodiments, the comfort level may correspond to a zone associated with the user. The zone of the user (e.g., a personal safety zone 22, 42, 12) is defined based on a personal comfort level. The personal comfort level may vary from a user to a user. In embodiments, the personal safety zone 22 of the pedestrian 20*a* may be larger than the personal safety zone 42 of the pedestrian 20*b*. For example, the vehicle 102 may drive an equal distance away from the pedestrian 20*a* and the pedestrian 20*b*, but only the pedestrian 20*a* may feel unsafe because the personal safety zone 22 of the pedestrian 20*a* is larger than the personal safety zone 42 of the pedestrian 20*b*. In other words, the pedestrian 20*a* may feel unsafe more easily than the pedestrian 20*b* because the vehicle 102 is more likely to drive into the personal safety zone 22 than the personal safety zone 42. Similarly, the driver 10 may have a personal safety zone 12 and the pedestrian 20*b* entering the personal safety zone 12 of the driver 10 may lead to anxiety and the driver 10 may feel unsafe.

In embodiments, the zone may include a user location of the user. For example, the center of the zone may be the user location, and the zone may have a radial shape (e.g., a circle, an ellipse, or the like). For another example, the user location may not be in the center of the zone but located off center. The user location may be obtained from a personal device 160 of the pedestrian 20*a*, a personal device 140 of the pedestrian 20*b*, and/or a location module 114 (FIG. 3) of the vehicle 102.

In embodiments, a notification may be provided to the vehicle 102 in response to a result of a comparison of the zone of a user such as the pedestrian 20*a* or 20*b* and a trajectory of the vehicle 102. For example, the notification may be provided to the vehicle 102 when the trajectory is directed toward the zone. For another example, the notification may be provided to the vehicle 102 when the trajectory indicates that the vehicle 102 may enter the zone of the user. The notification may include information associated with the zone. For example, the information may include the size of the zone, the timing when the vehicle 102 may enter the zone, the distance between the vehicle 102 and the zone, or the like. In some embodiments, a notification may be provided to the user such as the pedestrian 20*a* or 20*b* or other vehicles nearby.

The vehicle 102 may be controlled to drive based on the notification. In embodiments, the notification may change the operation of the vehicle 102. For example, the vehicle 102 may maintain current speed, slow down, or stop based on the notification (e.g., whether the notification is received) and/or the information included in the notification (e.g., the comfort level, the location of the vehicle 102 and the user, the size of the zone, or the like). The change in the operation of the vehicle 102 may be implemented by the driver 10 of the vehicle 102 (e.g., an autonomous or semi-autonomous vehicle, such as an ego vehicle).

Figure 3:
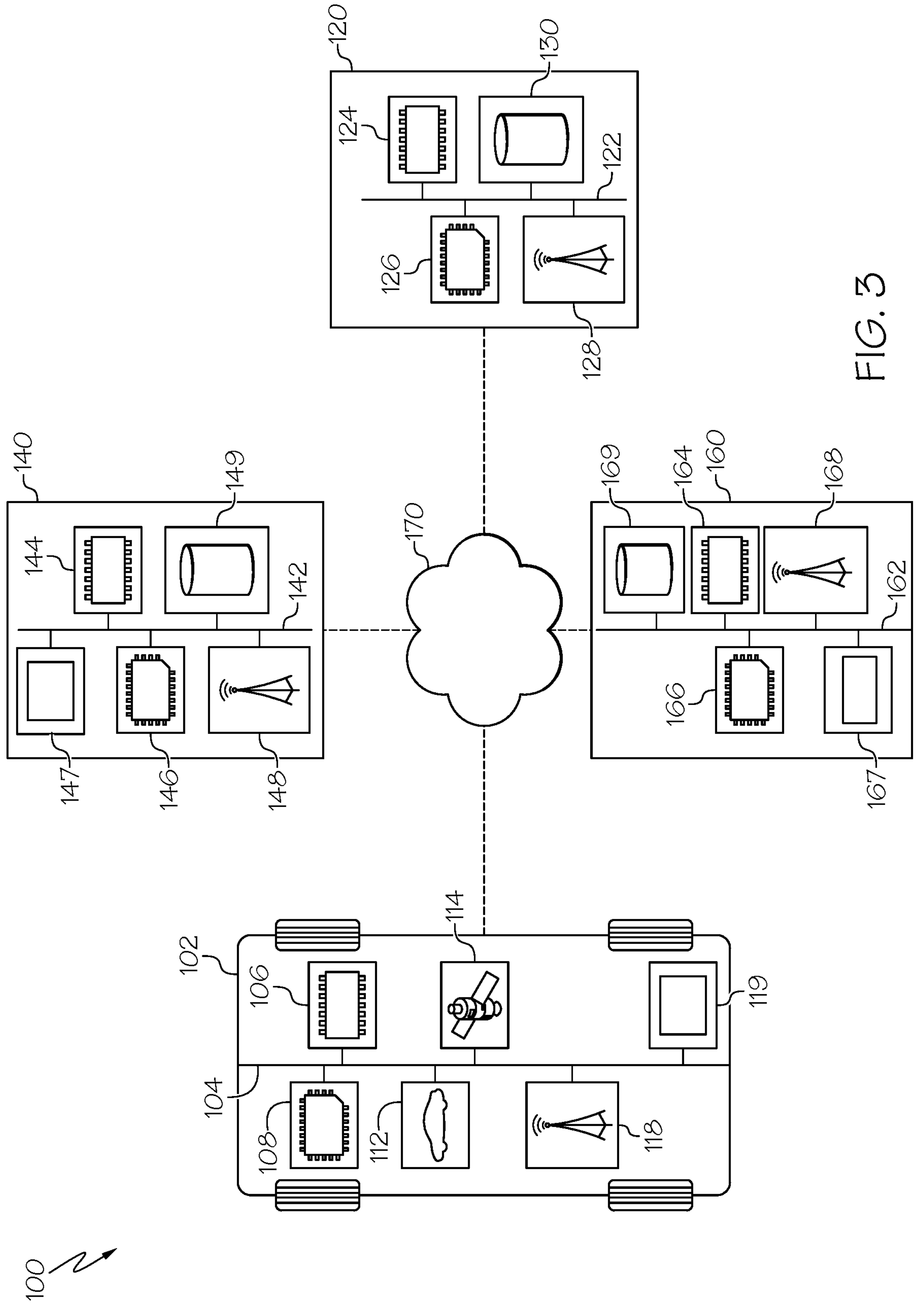
FIG. 3 depicts a schematic diagram of the system of FIG. 2, comprising a vehicle and a personal device, according to one or more embodiments shown and described herein.

Referring now to FIG. 3, a schematic diagram of the system 100 comprising the vehicle 102, at least one personal device 140, 160, and the server 120 is depicted. The vehicle 102 may include a processor 108, a memory 106, a driving assist module 112, a network interface 118, a location module 114, and an input/output interface (I/O interface 119). The vehicle 102 also may include a communication path 104 that communicatively connects the various components of the vehicle 102.

The processor 108 may include one or more processors that may be any device capable of executing machine-readable and executable instructions. Accordingly, each of the one or more processors of the processor 108 may be a controller, an integrated circuit, a microchip, or any other computing device. The processor 108 is coupled to the communication path 104 that provides signal connectivity between the various components of the connected vehicle. Accordingly, the communication path 104 may communicatively couple any number of processors of the processor 108 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth®, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 106 is coupled to the communication path 104 and may contain one or more memory modules comprising RAM, ROM, flash memories, hard drives, or any device capable of storing machine-readable and executable instructions such that the machine-readable and executable instructions can be accessed by the processor 108. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory 106. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented on any conventional computer programming language, as pre-programmed hardware elements, or as a combination of hardware and software components.

The vehicle 102 may also include a driving assist module 112. The driving assist module 112 is coupled to the communication path 104 and communicatively coupled to the processor 108. The driving assist module 112 may include sensors such as LiDAR sensors, RADAR sensors, optical sensors (e.g., cameras), laser sensors, proximity sensors, location sensors (e.g., GPS modules), and the like. The vehicle data gathered by the sensors may be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, autonomous driving, and/or the like. In embodiments, the driving assist module 112 may obtain facial features and/or gaits of the driver (e.g., the driver 10), and/or trajectory of the vehicle 102.

The vehicle 102 also comprises a network interface 118 that includes hardware for communicatively coupling the vehicle 102 to the server 120. The network interface 118 can be communicatively coupled to the communication path 104 and can be any device capable of transmitting and/or receiving data via a network or other communication mechanisms. Accordingly, the network interface 118 can include a communication transceiver for sending and/or receiving any wired or wireless communication. For example, the hardware of the network interface 118 may include an antenna, a modem, a LAN port, a Wi-Fi card, a WiMAX card, a cellular modem, near-field communication hardware, satellite communication hardware, and/or any other wired or wireless hardware for communicating with other networks and/or devices. The vehicle 102 may connect with one or more other connected vehicles and/or external processing devices (e.g., the server 120) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A location module 114 is coupled to the communication path 104 such that the communication path 104 communicatively couples the location module 114 to other modules of the vehicle 102. The location module 114 may comprise one or more antennas configured to receive signals from a GPS satellite tracking system. Specifically, in one embodiment, the location module 114 includes one or more conductive elements that interact with electromagnetic signals transmitted by the GPS satellite tracking system. The received signal is transformed into a data signal indicative of the location (e.g., latitude and longitude) of the location module 114, and consequently, the vehicle 102.

The vehicle 102 may include an I/O interface 119. The I/O interface 119 may be disposed inside the vehicle 102 such that an occupant of the vehicle 102 may see. The I/O interface 119 may allow for data to be presented to a human driver and for data to be received from the driver. For example, the I/O interface 119 may include a screen to display information to a user, speakers to present audio information to the user, and a touch screen that may be used by the user to input information. The I/O interface 119 may output information that the vehicle 102 received from the server 120. For example, the I/O interface 119 may display instructions to follow a route generated by the server 120, such as turn-by-turn instructions.

In some embodiments, the vehicle 102 may be communicatively coupled to the server 120 by a network 170 via the network interface 118. The network 170 may be a wide area network, a local area network, a personal area network, a cellular network, a satellite network, a cloud, or the like.

The server 120 comprises a processor 126, a memory component 124, a network interface 128, a data storage 130, and a communication path 122. Each server 120 component is similar in features to its connected vehicle counterpart, described in detail above. It should be understood that the components illustrated in FIG. 3 are merely illustrative and are not intended to limit the scope of this disclosure. More specifically, while the components of the vehicle 102 in FIG. 3 are illustrated as residing within vehicle 102, this is a non-limiting example. In some embodiments, one or more of the components may reside external to the vehicle 102, such as with the server 120.

The personal device 140 comprises a processor 146, a memory component 144, a network interface 148, an I/O device 147, a data storage 149, and a communication path 142. Each component of the personal device 140 is similar in features to its connected vehicle counterpart, described in detail above. The I/O device 147 may provide an interface for the user to input a comfortable level and/or a reaction of the user to the road situation. In embodiments, the I/O device 147 may include a camera which may obtain facial features, gaits, and/or trajectory of the user. In embodiments, bidirectional communication is provided between the personal device 140 and the server 120. The user may input information associated with the comfortable level of the user in the road situation via the personal device 140. For example, the user may input a location, time, or any details of the road situation associated with the comfort level using the personal device 140, and the information may be transmitted to the server 120. The information may be further transmitted from the server 120 to others, such as other personal devices or vehicles. The server 120 may transmit information stored in the server 120 to the personal device 140.

In embodiments, the personal device 140 may receive a notification from other personal devices (e.g., the personal device 160), vehicles (e.g., the vehicle 102), or servers (e.g., the server 120). The notification may provide information associated with the zone (e.g., the personal safety zone, or the like) of the other personal devices or vehicles.

The personal device 160 comprises a processor 166, a memory component 164, a network interface 168, an I/O device 167, a data storage 169, and a communication path 162. Each component of the personal device 160 is similar in features to its connected vehicle counterpart and/or the personal device 140, as described in detail above. The I/O device 167 may provide an interface for the user to input a comfortable level and/or a reaction of the user to the road situation. In embodiments, the I/O device 147 may include a camera which may obtain facial features, gaits, and/or trajectory of the user. In embodiments, bidirectional communication is provided between the personal device 160 and the server 120. The user may input information associated with the comfortable level of the user in the road situation via the personal device 160. For example, the user may input a location, time, or any details of the road situation associated with the comfort level using the personal device 160, and the information may be transmitted to the server 120. The information may be further transmitted from the server 120 to others, such as other personal devices or vehicles. The server 120 may transmit information stored in the server 120 to the personal device 160.

In embodiments, the personal device 160 may receive a notification from other personal devices (e.g., the personal device 140), vehicles (e.g., the vehicle 102), or servers (e.g., the server 120). The notification may provide information associated with the zone (e.g., the personal safety zone, or the like) of the other personal devices or vehicles.

Data (e.g., the comfort level, the zone, the sensor data, the location data, the vehicle data, or the like) from the vehicle 102, the personal device 140, and the personal device 160 may be transmitted via the network 170 and/or shared between the vehicle 102, the personal device 140, and the personal device 160 and/or transmitted to the server 120.

Figure 4:
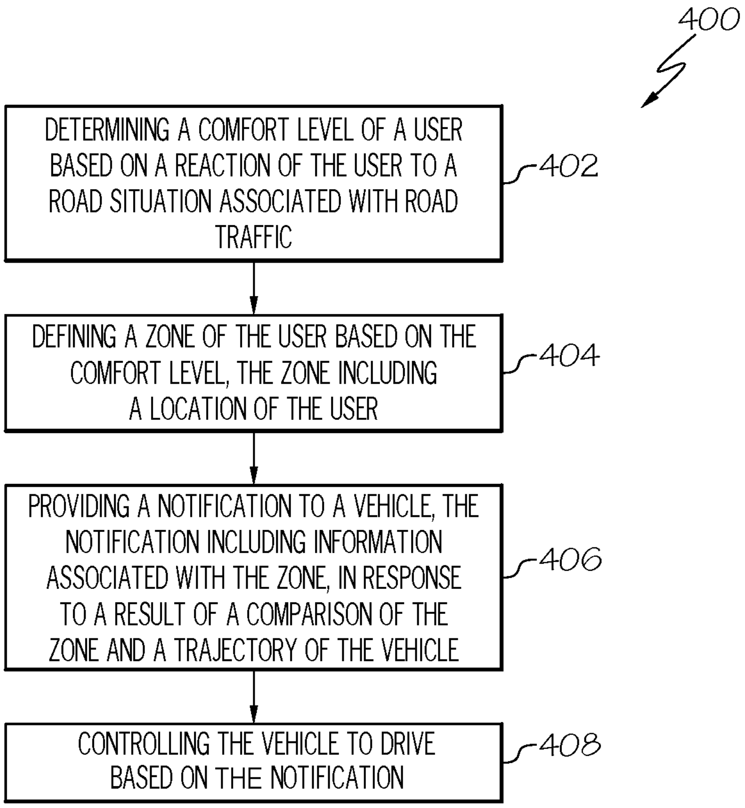
FIG. 4 depicts a flowchart of a method that may be performed by the vehicle and/or the server of FIG. 3, according to one or more embodiments shown and described herein.

Referring to FIG. 4, a flowchart of a method 400 that may be performed by the vehicle 102 and/or server 120 of FIGS. 2 and 3 is depicted. At step 402, a comfort level of a user is determined based on a reaction of the user to a road situation associated with road traffic. In embodiments, the user may use a personal device (e.g., the personal device 140, 160) to input a perceived safety level. The perceived safety level may constitute the reaction of the user. In embodiments, the reaction may be based on a self-reported comfort level. For example, the perceived safety level may be received in the form of a text describing the perceived safety level, selection of an image (e.g., selecting a button with a feel safe icon or a button with a feel unsafe icon, or the like), or the like. The received perceived safety level in association with the current location of the user may be stored in the personal device (e.g., the data storage 149, 169) or transmitted to a server (e.g., the server 120). In embodiments, the reaction of the user may be determined based on data obtained from the personal device or the vehicle. The data may include bodily reactions (e.g., facial features, gaits, and/or trajectory of the user and/or the driver of the vehicle). In embodiments, the reaction may be based on location information of the user. For example, the location information may indicate that the user maintains a certain distance from vehicles on the road. The comfort level may be inversely correlated to the distance the user maintains as to an external object. Specifically, if the distance the user maintains as to an external object is relatively long, the comfort level may be determined as relatively low, and if the distance the user maintains as to the external object is relatively short, the comfort level may be determined relatively high.

In embodiments, the comfort level may be associated with the road situation. For example, the comfort level may be determined specific to a certain road situation. In embodiments, information associated with the road situation may be utilized to determine the comfort level. For example, the comfort level may be reduced when the road situation indicates an unsafe situation (e.g., high in traffic, high accident rates, complex intersections, high number of lanes, or the like). In embodiments, the road situation may be determined based on current or historical data associated with the location. The current or historical data associate with the road situation may obtained from the personal device, the server, or the vehicle. For example, data from the personal device may receive input of the road situation from the user, data from the server may be obtained from a database communicatively coupled to the server, or data obtained from the vehicle (e.g., sensor data from the driving assist module 112). The road situation may be associated with the current location of the user or a location that has similar attributes associated with the road situation to the current location.

In embodiments, the comfort level of the user may be determined based on a machine learning model generated based on a prior observation of the reaction of the user to the road situation. For example, model data (e.g., pre-learned model) may be generated based on the reaction and the model data may be trained to determine the comfort level. In embodiments, in case the user feels uncomfortable but no notification is provided, the comfort level may be adjusted to a lower level than the current level. Also, in case the user feels comfortable but a notification is provided, the comfort level may be adjusted to a higher level than the current level.

In embodiments, the comfort level may be determined based on a cumulative score that is computed based on the reaction of the user. For example, a value of 0% may indicate the lowest comfort level, whereas a value of 100% may indicate the highest comfort level.

At step 404, a zone of the user is defined based on the comfort level. The zone corresponds to a location of the user. In embodiments, the zone (e.g., the personal safety zone 22, 42, 12 in FIG. 2) may be defined based on the comfort level, and the zone may be defined as an area associated with the location of the user. The size of the zone may be inversely correlated to the comfort level. For example, by referring to FIG. 2, the comfort level of the pedestrian 20*b* is greater than the comfort level of the pedestrian 20*a*. Then, the size of the zone 42 of the pedestrian 20*b* is smaller than the size of the zone 22 of the pedestrian 20*a*. In embodiments, the zone may include the location of the user. For example, the center of the zone may be the user location, and the zone may have a radial shape (e.g., a circle, an ellipse, or the like). For another example, the location may not be in the center of the zone but located off center. The location may be obtained from the personal device or the vehicle (e.g., the personal device 140, 160, the location module 114, or the driving assist module 112). In embodiments, the zone may be pre-defined based on a pre-learned model based on prior observations on the road situation. The road situation may be associated with the same the current location of the user or a location with a road situation having similar features (e.g., intersections, roundabouts, high accident locations, or the lie). In embodiments, information associated with the zone may be uploaded to a cloud (e.g., the network 170) and is downloaded by the vehicle that is in the process of driving maneuvers (e.g., turning right or left, or accelerating, or the like) when the user is in the process of entering a crosswalk or a roadway. The zone may be downloaded by multiple vehicles located in the vicinity of the user or the zone.

At step 406, a notification is provided to a vehicle in response to a result of a comparison of the zone of the user and a trajectory of the vehicle. The notification includes information associated with the zone. In embodiments, the information may include the location of the user, the size of the zone, and/or a distance of the vehicle from the zone. For example, the distance may be the minimum distance between the vehicle and the zone. In embodiments, a positional relationship of the zone and the trajectory may be compared. The positional relationship may include coordinate parameters, such as an angle, a distance, or the like. In embodiments, the notification to the vehicle may be provided prior to the vehicle entering the zone.

In embodiments, the comparison may include determining a probability of the vehicle entering the zone based on the trajectory of the vehicle, the location of the user, and the zone. For example, the probability may be high when the comparison indicates that the vehicle is directed toward the zone or the location of the user, a moving speed of the vehicle and/or the user may indicate whether the vehicle may enter the zone in a certain amount of time. When the zone size is large and the edge of the zone is close to the vehicle based on the location of the zone and the vehicle, the probability is high that the vehicle may enter the zone.

In embodiments, the notification may be provided to multiple vehicles present in the vicinity of the user or the vehicle. For example, the multiple vehicles may be connected vehicles, such that information on trajectories of the vehicles may be shared between the vehicles to improve maneuver planning between the vehicles.

In embodiments, a notification may be provided to the user, e.g., the device of the user, and the notification may notify that the vehicle is approaching the zone in response to the probability is higher than a threshold value. The threshold value may be set based on the comfort level of the user. For example, the threshold value of the probability may be proportional to the comfort level of the user. The threshold value may be set higher when the comfort level of the user is higher, and the threshold value may be set lower when the comfort level of the user is lower. The notification to the user may include the size of the zone, the timing when the vehicle may enter the zone, the distance between the vehicle and the zone or the user, or the like. The notification may be a visual or audio signal provided to the user to warn that the vehicle is approaching the user and/or the zone.

In embodiments, whether the comfort level is higher than a threshold value may be determined. The vehicle may be allowed to enter the zone in response to determining that the comfort level is higher than the threshold value. For example, the vehicle may be instructed to maneuver without avoiding entering the zone. A notification may be sent to the user to notify that the vehicle is entering the zone to ensure safety of the user. In embodiments, the notification to the user may be sent prior to the vehicle entering the zone.

In embodiments, the notification to the vehicle may be modified based on a historical driving behavior of the vehicle or a driver of the vehicle. For example, with reference to FIG. 1, when the historical driving behavior of the vehicle 102 suggests that the vehicle 102 missed the pedestrian 20*b* when turning left because the vehicle 102 tends to focus on whether to give the right of way to the pedestrian 20*a*, the notification may be provided to the vehicle 102 when the vehicle 102 is in a similar situation. (e.g., a similar road situation, such as the vehicle 102 turning left. The historical driving behavior may include the historical driving behavior of the driver of the vehicle 102 (e.g., the driver 10 in FIG. 2). In embodiments, the notification may include contents, such as suggestions and warnings that are relevant to the historical driving behavior, and the contents may be modified to personally augment the notification. For example, the notification may include a suggestion of paying attention to objects (e.g., pedestrians, cyclists, or the like) approaching from the right side of the vehicle when the vehicle is turning left.

In embodiments, a notification may be provided to the user in response to a determination of a condition requiring caution identified based on a historical driving behavior of the driver of the vehicle. The notification may include information associated with the vehicle approaching the zone. For example, the driver may be classified to several classes, which may include safe, aggressive, distracted, notification abiding (e.g., following the suggestions or recommendations provided by the notification), or the like. The driver may also be classified based on whether the notification is accepted by the driver (e.g., whether the notification is received). When the driver is classified as safe, the notification may not be provided. In some embodiments, the notification may still be provided to communicate that the driver is classified as safe (e.g., safe, notification abiding, or the like) to prevent anxiety in the user. The notification may be sent out when the driver is classified as unsafe (e.g., aggressive, distracted, or the like) to warn the user. The notification may be provided to the user when the driver does not accept notifications (e.g., no communication to the vehicle is made, the driver declines to receive notifications, or the like) so that the user may pay extra attention to the vehicle.

At step 408, the vehicle is controlled to drive based on the notification. In embodiments, the vehicle may be maneuvered to avoid entering the zone in response to the notification indicating that the comfort level is equal to or lower than the threshold value. In embodiments, the vehicle may be maneuvered to slow down while approaching the zone, and/or the vehicle may be maneuvered to stop. For example, the vehicle may slow down and stop before entering the zone. In embodiments, the vehicle may be maneuvered to driver around the zone. For example, the vehicle may make turns to avoid entering the zone. In embodiments, the vehicle may be allowed to enter the zone in response to the notification indicating that the vehicle may enter the zone (e.g., the comfort level is higher than the threshold value). For example, the vehicle may be controlled to maintain the current trajectory (e.g., maintaining the current angle and/or speed). The vehicle may be maneuvered to slow down but still entering the zone.

It is noted that the method 400 as described above with reference to FIG. 4 with various embodiments may be performed by any of the components of the system 100. For example, the method 400 may be performed by the vehicle 102 (e.g., the processor 108), the personal devices 140, 160 (e.g., the processors 146, 166), and/or the server 120 (e.g., the processor 126), or the like. For example, all of the steps 402-408 may be performed by one component of the system 100 or performed by several components of the system 100.

It should now be understood that methods and systems for providing a personalized notification is provided. The notification may be personalized based on a comfort level of users. The comfort level may be determined based on a reaction of the user to a road situation. The users may self-report of the system may determine the comfort level of the users and tailor the notification based on the comfort level. Since the comfort level takes the road situation into consideration, the comfort level may be tailored to reflect a certain road situation that may increase or decrease the comfort level of a certain individual. The notification may be tailored regarding when to send out and/or what kind of information to send out as the notification. As such, the notification may convey personal preferences with respect to safety or perceived (e.g., psychological) safety zone which may allow the system to account for individual differences. The system may ensure actual safety of the user as well as perceived safety of the user. The system may also increase accuracy of determination of the perceived comfort level.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method comprising:

determining a comfort level of a user based on a reaction of the user to a road situation associated with road traffic at a location, wherein the user is outside of a vehicle;

defining a zone of the user based on the comfort level, the zone including a user location of the user, wherein a size of the zone is inversely correlated to the comfort level;

providing a notification to the vehicle, the notification including information associated with the zone, in response to a result of a comparison of the zone and a trajectory of the vehicle; and causing vehicle operation control based on the notification.

2. The method of claim 1, wherein the comfort level of the user is determined based on one or more of a machine learning model generated based on a prior observation of the reaction of the user at the location, or a cumulative score that is computed based on the reaction of the user.

3. The method of claim 1, further comprising;

determining a driver comfort level of a driver of the vehicle based on a reaction of the driver to a road situation associated with road traffic at a location;

defining a driver zone of the driver based on the driver comfort level and the location of the driver; and providing a notification to at least one of the driver or the user, the notification including information associated with the driver zone, in response to a result of a comparison of the trajectory of the vehicle and one or more of the zone or the driver zone.

4. The method of claim 1, further comprising:

determining whether the comfort level is higher than a threshold value; and allowing the vehicle to enter the zone in response to determining that the comfort level is higher than the threshold value.

5. The method of claim 1, further comprising:

determining a probability of the vehicle entering the zone based on the trajectory of the vehicle, the location of the user, and the zone; and providing a notification of the vehicle approaching the zone to the user in response to the probability is higher than a threshold value.

6. The method of claim 1, wherein the information includes a distance of the vehicle from the zone.

7. The method of claim 1, wherein the notification to the vehicle is provided prior to the vehicle entering the zone.

8. The method of claim 1, further comprising:

modifying the notification to the vehicle based on a historical driving behavior of the vehicle or a driver of the vehicle.

9. The method of claim 1, further comprising:

providing, to one or more of the user or a driver of the vehicle, or the vehicle, a notification including information associated with the vehicle approaching the zone, in response to a determination of a condition requiring caution identified based on a historical driving behavior of the vehicle or a driver of the vehicle.

10. The method of claim 1, further comprising:

maneuvering the vehicle to keep the vehicle out of the zone.

11. The method of claim 10, wherein the vehicle is maneuvered to slow down while approaching the zone or maneuvered to stop.

12. A system comprising:

one or more processors; and memory containing executable instructions, the executable instructions being executable by the one or more processors to:

determine a comfort level of a user based on a reaction of the user to a road situation associated with road traffic, wherein the user is outside of a vehicle;

define a zone of the user based on the comfort level, the zone including a location of the user, wherein a size of the zone is inversely correlated to the comfort level;

provide a notification to the vehicle, the notification including information associated with the zone, in response to a result of a comparison of the zone and a trajectory of the vehicle; and cause vehicle operation control based on the notification.

13. The system of claim 12, wherein the executable instructions are further executable by the one or more processors to:

determine whether the comfort level is higher than a threshold value; and allow the vehicle to enter the zone in response to the comfort level is determined to be higher than the threshold value.

14. The system of claim 12, wherein the executable instructions are further executable by the one or more processors to:

determine a probability of the vehicle entering the zone based on the trajectory of the vehicle, the location of the user, and the zone; and provide a notification of the vehicle approaching the zone to the user in response to the probability being higher than a threshold value.

15. The system of claim 12, wherein the information includes a distance of the vehicle from the zone.

16. The system of claim 12, wherein the notification to the vehicle is provided prior to the vehicle entering the zone.

17. The system of claim 12, wherein the executable instructions are further executable by the one or more processors to:

modify the notification to the vehicle based on a historical driving behavior of the vehicle or a driver of the vehicle.

18. The system of claim 12, wherein the executable instructions are further executable by the one or more processors to:

provide, to one or more of a driver or the user, a notification including information associated with the vehicle approaching the zone, in response to a determination of a condition requiring caution identified based on a historical driving behavior of the vehicle or a driver of the vehicle.

19. The system of claim 12, wherein to cause the vehicle operation control, the executable instructions are further executable by the one or more processors to:

maneuver the vehicle to keep the vehicle out of the zone.

20. A method comprising:

determining a comfort level of a user based on a reaction of the user to a road situation associated with road traffic at a location, wherein the user is outside of a vehicle;

defining a zone of the user based on the comfort level, the zone including a user location of the user, wherein a size of the zone is inversely correlated to the comfort level;

receiving a notification by the vehicle, the notification including information associated with the zone, in response to a result of a comparison of the zone and a trajectory of the vehicle; and causing vehicle operation control based on the notification.

* * * * *